United States Patent Office 3,473,426
Patented Oct. 21, 1969

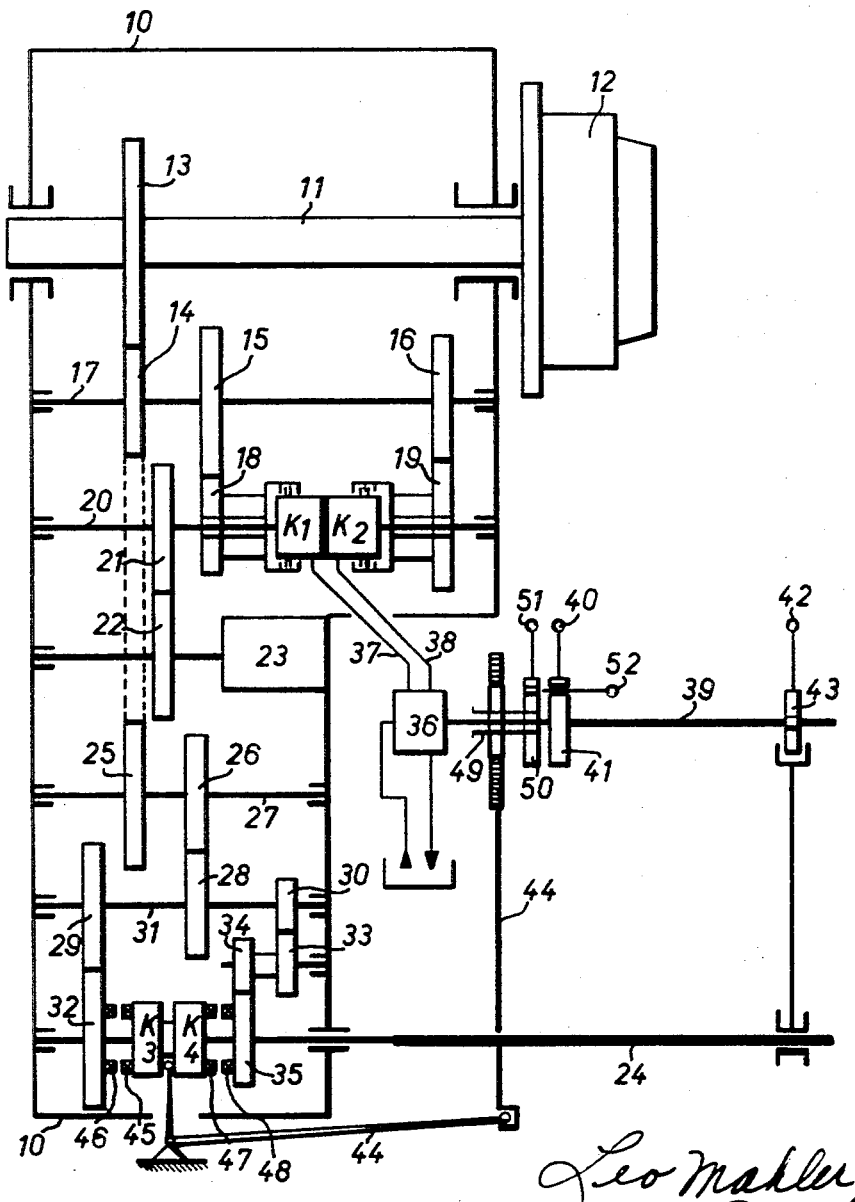

3,473,426
DEVICE ON A LATHE, PARTICULARLY FOR THREAD-CUTTING
Leo Mahler, Uster, Switzerland, assignor to Oerlikon-Buhrle Holding Ltd., Zurich, Switzerland
Filed Mar. 10, 1967, Ser. No. 622,279
Claims priority, application Switzerland, Mar. 15, 1966, 3,799/66
Int. Cl. B23b 1/00; B23g 1/00
U.S. Cl. 82—5
1 Claim

ABSTRACT OF THE DISCLOSURE

A device on a lathe which is particularly suitable for thread cutting, having a control shaft in order to change over the speed of a work spindle from a first to a second value and having a control member to reverse the direction of movement of a slide. Furthermore, the device comprises means for connecting the control shaft detachably to the control member in order that, when the control shaft is connected to the control member, when the speed of the work spindle is changed over, the direction of movement of the slide is reversed simultaneously.

The invention relates to a device on a lathe, particularly for thread-cutting.

It is an object of the invention to facilitate the operation of the lathe, particularly during thread-cutting.

A further object of the invention is a simplification in the control elements which are necessary for the operation of the lathe, particularly during thread-cutting. These control elements comprise a control shaft for changing over the speed of the work spindle from a first to a second value, as well as a control member for reversing the direction of movement of a slide.

A further object is to provide a device whereby a second shaft extending over the whole length of the lathe for reversing the direction of movement of the slide is unnecessary.

The device is particularly advantageous during thread-cutting. If a thread is to be cut in a plurality of operational stages, the direction of movement of the slide has to be reversed after each operational stage and the slide restored to its initial position. In order that the slide may return to its initial position as quickly as possible, the speed of the work spindle must be increased because, during thread-cutting, the speed of motion of the slide depends on the speed of the work spindle. Thus it was hitherto necessary, on each reversal of the slide, to actuate two control levers, first in order to change over the speed of the work spindle and second to reverse the direction of movement of the slide.

An object of the invention is to render it possible to change over the speed of the work spindle automatically on reversal of the direction of movement of the slide without the operator being obliged to actuate two levers.

A further object of the invention is to provide a coupling to connect the control member to the control shaft. This coupling may consist of two discs mounted side by side, one of which is secured to the control shaft and the other to the control member and a pin for connecting the two discs to one another.

A further object is to provide a construction where the higher speed of the work spindle is preferably associated with the return motion of the slide to its initial position after the working movement.

With the above and other objects in view an example of an embodiment of the device according to the invention is described in detail below with reference to the accompanying diagrammatic drawing.

In the single figure of the drawing, the kinematic construction of a lathe is illustrated in simplified form with the parts which are unnecessary for an understanding of the invention being omitted.

A work spindle 11 is mounted for rotation in the usual manner in a housing 10 and comprises, at the right-hand end, a spindle nose 12 to which a workpiece can be secured in known manner, for example by means of a jaw chuck. Secured to the work spindle is a gear wheel 13 which is in engagement with a gearwheel 14. The gearwheel 14 is secured, together with two other gearwheels 15 and 16, to a shaft 17 which is likewise mounted in the housing 10.

The gearwheel 15 is constantly in mesh with a gearwheel 18 and the gearwheel 16 is likewise constantly in mesh with a gearwheel 19. These two gearwheels 18 and 19 are mounted for rotation on a shaft 20 which in turn is mounted in the housing 10. Two hydraulic couplings $K_1$ and $K_2$ are provided on this shaft 20. The gearwheel 18 can be connected to the shaft 20 by means of the coupling $K_1$ and the gearwheel 19 can be connected to the shaft 20 by means of the coupling $K_2$. A gearwheel 21, which is further secured to the shaft 20 is in mesh with the gearwheel 22, which is secured to a motor 23.

As is clear from the main transmission gear of a lathe, which has been described and which is illustrated in greatly simplified form, the work spindle 11 can be driven either through the gear train 13, 14; 15, 18 and 21, 22 from the motor 23 at a first speed $n_1$, if the coupling $K_1$ is engaged in a manner described below, or through the gear train 13, 14; 16, 19 and 21, 22 at a second speed $n_2$, if the coupling $K_2$ is engaged. In this main transmission gear, all the gear wheels are constantly in mesh with one another. Hydraulic multiple-disc couplings, which can be operated even when the gear is running, are provided for the two couplings $K_1$ and $K_2$. Thus it is possible to change over from the one speed $n_1$ to the other speed $n_2$ with the gear running. In practice, the main transmission gear comprises a number of further gearwheels which can be brought selectively into engagement with one another so that further speeds can be set apart from the speeds $n_1$ and $n_2$. Since these gearwheels are of no interest in connection with the present invention, however, they are not illustrated here. $n_2$ preferably=1.4 $n_1$ or more precisely=$\sqrt{2}n_1$.

The drive of a leadscrew 24 is effected from the drive spindle 11 through the gearwheels 13 and 14 to a further gearwheel 25 which is in engagement with the gearwheel 14 through further gearwheels indicated by a broken double line. The gearwheel 25, together with the gearwheel 26, is secured to a shaft 27 which is likewise mounted in the housing 10. The gearwheel 26 is in mesh with a gearwheel 28 which, together with two gearwheels 29 and 30, is secured to a shaft 31 which is mounted in the housing 10. The gearwheel 29 is directly in mesh with a gearwheel 32 mounted on the leadscrew 24, while the gearwheel 30 is in engagement, through two gearwheels 33 and 34 reversing the direction of rotation, with a gearwheel 35 which is likewise mounted on the leadscrew 24.

Two dog clutches $K_3$ and $K_4$ are provided on the leadscrew 24. The gearwheel 32 can be connected to the leadscrew 24 through the clutch $K_3$ and the gearwheel 35 can be connected to the leadscrew through the clutch $K_4$. The number of teeth in the gearwheels described 13, 14, 25, 26, 28, 29, 30, 33, 34 and 35 are preferably selected in such a manner that the speed of the leadscrew 24 is twice as great as the speed of the work spindle 11.

As can be seen from the gearing described for the leadscrew, the leadscrew 24 rotates, for example in the same direction as the work spindle, when the clutch $K_3$ is engaged and in the opposite direction to the work spindle when the clutch $K_4$ is engaged. For the clutches $K_3$ and $K_4$, dog clutches are preferably used which ensure that, during the thread-cutting for example, the position of an apron displaced by the leadscrew always coincides with the particular position of the work spindle, regardless of which of the clutches $K_3$ and $K_4$ is engaged.

A control valve 36, which is connected to the clutches $K_1$, $K_2$ through two hydraulic pipelines 37 and 38, is provided for the engagement and disengagement of the clutches $K_1$ and $K_2$. Connected to the control valve 36 is a control shaft 39. This control shaft can be pivoted into a first position in which the clutch $K_1$ is engaged and into a second position in which the clutch $K_2$ is engaged. In order to pivot the control shaft 39, a first lever 40 is secured to a disc 41 rigidly connected to the control shaft 39. Furthermore, in order to pivot the control shaft 39, a second lever 42 is secured to a disc 43 which is mounted for displacement but held against rotation on the control shaft 39. The disc 43 which the lever 42 is preferably on the apron, not illustrated, of the lathe and is displaced with the apron along the control shaft 39.

For the engagement and disengagement of the clutches $K_3$ and $K_4$, a linkage 44 is provided whereby either the dogs 45 of the clutch $K_3$ can be brought into engagement with the dogs 46 provided on the gearwheel 32 or the dogs 47 on the clutch $K_4$ can be brought into engagement with the dogs 48 provided on the gearwheel 35. The linkage 44 is connected to a tube 49 which is mounted for rotation on the control shaft 39 and which can likewise be pivoted into two positions, the clutch $K_3$ being engaged in the first position of the tube 49 and the clutch $K_4$ in the second position of the tube 49. A disc 50 with a lever 51 is secured to one end of the tube 49 for the pivoting thereof.

According to the invention, the two discs 41 and 50 for the engagement and disengagement of the clutches $K_1$, $K_2$ or of the clutches $K_3$, $K_4$ respectively are mounted side by side and each of the discs comprises a bore for example which are in alignment with one another when control shaft 39 and control tube 49 are in their first pivotal position, so that a pin 52 can be passed through the two discs 41 and 50. Each disc may comprise a further bore, which are aligned in relation to one another when the control shaft 39 is in its first pivotal position and the control tube in its second pivotal position, so that the pin 52 can again be passed through the two discs 41 and 50 as a result of which, however, their relative position is different from the first case.

In practice, the leadscrew 24 is not connected directly to the clutches $K_3$ and $K_4$ but through feed gearing whereby the rate of feed of the apron driven by the leadscrew 24 can be set. Since this feed gearing is of no interest in connection with the present invention, this feed gearing is not illustrated here.

The mode of operation of the device described is as follows:

Let it be assumed, for example, that a thread has to be cut in a plurality of operational stages. For each operational stage, the slide with the threading tool is displaced in one direction of movement and has to be restored to its initial position after the termination of the operational stage. The clutch $K_1$ is engaged for the operational stage in each case in order that the work spindle, with the workpiece secured thereto, on which the thread is to be cut, may rotate at the required speed $n_1$. Simultaneously, the clutch $K_3$ is engaged in order that the slide may be displaced in one direction of movement at the required speed. The control shaft 39 is thus in its first position and the tube 49 is likewise in its first position. The pin 52 is passed through the two discs 41 and 50.

As soon as one operational stage is terminated, the clutch $K_1$ is disengaged and the clutch $K_2$ is engaged, the control shaft 39 being pivoted into its second position. As a result, the work spindle 12 rotates at the second speed $n_2$ which is higher, for example, than the first speed. At the same time, the clutch $K_3$ is disengaged and the clutch $K_4$ engaged because the two discs 41 and 50 are connected to one another by the pin 52 and so, on actuation of the control shaft 39, the control tube 49 also passes out of its first position into its second position. Since the work spindle is now rotating at the higher speed $n_2$, the leadscrew 24 is also driven faster, and since the clutch $K_4$ has been engaged, the leadscrew rotates in the opposite direction and restores the slide to its initial position at an increased speed.

Instead of the clutch consisting of the two discs 41 and 50 and the pin 52 passed through the two discs, any other suitable clutch may be used. Instead of the tube 49 which is mounted concentrically with the control shaft 39, a shaft may be provided which is parallel with the control shaft 39 and which can be coupled to the control shaft for example through gearwheels.

A brake position, in which the work spindle 12 can be braked, may be provided between the first and second control position of the control shaft 39. This is a particular advantage when the work spindle rotates in the opposite direction at the speed $n_2$ to the speed $n_1$.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A lathe, particularly for cutting threads, comprising a work spindle, a lead screw, a control shaft for changing the rotation speed of said work spindle from a first value to a second value, a first control lever for changing the direction of rotation of said lead screw, a gear connection between said work spindle and said lead screw, said gear connection having a fixed, constant gear ratio when changing the direction of rotation of said lead screw, a releasable mechanical clutch, a second control lever for moving said control shaft with said releasable mechanical clutch between said control shaft and said first control lever so that when engaging said first control lever with said control shaft in a first position of said second control lever a first rotation speed of said work spindle is engaged in one direction of rotation of said lead screw and in a second position of said second control lever a second speed of rotation of said work spindle is engaged in the other direction of rotation of said lead screw.

References Cited

UNITED STATES PATENTS

| 2,399,621 | 5/1946 | Bodmer | 10—101 |
| 2,419,704 | 4/1947 | Bodmer | 10—101 |

FOREIGN PATENTS

| 1,370,759 | 7/1964 | France. |
| 1,072,058 | 12/1959 | Germany. |

HARRISON L. HINSON, Primary Examiner

U.S. Cl. X.R.

10—101